Aug. 8, 1950     E. E. EICKMEYER ET AL     2,517,853
APPARATUS FOR WELDING TANKS
Filed Feb. 20, 1946
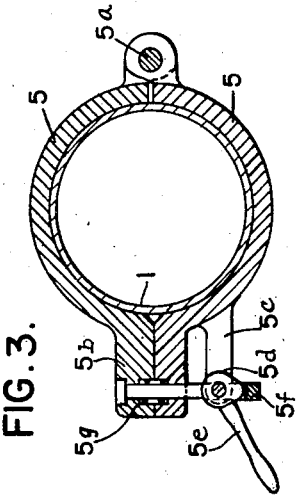
INVENTOR
EARL E. EICKMEYER
BY SAMUEL O. MAINS
Toulmin & Toulmin
ATTORNEYS Patented Aug. 8, 1950

2,517,853

UNITED STATES PATENT OFFICE 2,517,853

APPARATUS FOR WELDING TANKS

Earl E. Eickmeyer and Samuel O. Mains, Dayton, Ohio, assignors to The Dayton Pump and Mfg. Company, Dayton, Ohio, a corporation of Ohio Application February 20, 1946, Serial No. 648,994

5 Claims. (Cl. 113—59)

Our invention relates to apparatus for the manufacture of tanks.

It is the object of this invention to provide means of rapidly manufacturing pressure tanks in quantity with the minimum of manual handling and with the maximum accuracy of assembly and welding.

It is an object of this invention to provide means of holding the ends of a tank against the ends of a body of a tank, rotating the ends and body of the tank together and simultaneously welding; and thereafter providing for ready means of removing the completed tank.

It is a further object of this invention to hold the tank body and the tank ends in predetermined engagement with one another so there will be uniformity in the tanks produced according to our method.

Referring to the drawings:

Figure 1 illustrates the mechanism of our invention with the tank in section and certain of the supporting parts in section.

Figure 2 is a section on the line 2—2 of Figure 1 looking in the direction of the arrows.

Figure 3 is a section on the line 3—3 indicating the arrangement of the clamp 5.

Referring to the drawings in detail, 1 designates a tank body of cylindrical form, against the ends of which at 2 are mounted the tank ends 3, the outer margins of which at 4 engage the ends 2 of the tank 1.

The tank body 1 is mounted at either end in the holder rings 5, which are in turn mounted upon the frame members 6. The frame members 6 are bolted by the bolts 7 to the ring 8 that serves to support the tank body during rotation. The ring 8 is provided with a V-shaped flange 9 that rides at the bottom in a pair of spaced grooved rollers 10 and 11 supported in the bracket 12. This bracket 12 in turn is mounted on a shaft 13. The shaft 13 is supported in the bearings 14 within the supporting block 15 that is mounted on one end of the bracket 16.

The rollers 10 and 11 are actuated by the pulley 17 through the belt 18 from a motor driven pulley 19 on the armature shaft 20 of the electrical motor 21 mounted on the bracket 22, which in turn is attached to the support 12.

The upper side of the ring 8 is engaged by a grooved guide wheel 23 which is mounted on the axle 24 in the bifurcated support 25, which in turn is provided with a shaft 26 mounted in bearings 27 in the supporting head 28 at the upper end of the bracket 16. The bracket 16 is supported upon any suitable support at 16a.

Thus is it possible, upon the completion of the tank, to rotate the tank about an axis at right angles to its major axis in order to remove the tank from its support. Likewise, a new tank body is rotated within the supporting frame 5 and then the tank body is rotated to the position shown in Figure 1, whereupon the tank head carriers 29 move towards the end of the tank, carrying the tank heads 3 by any suitable means, such as magnetism to cause them to engage at their flanges 4 with the ends 2 of the tank body 1. Such tank head carriers 29 are supported upon a piston rod 30 which is mounted on bearings 31 within a sleeve 32 on the end of the carrier 29. The piston rod is connected to a suitable piston within the cylinder 33 which is supplied with either air, steam or other form of pressure through the pipes 34 and 35. By this arrangement the head 29 is reciprocated and it is also possible for the head to rotate with the carrier while being held in position and welded.

The welding operation takes place through the welders generally designated 36. The welding rod 37 is brought closely adjacent to the juncture of the end 2 and flange 4 so that the welding operation can take place.

After this takes place, as a result of the rotation of the body and heads of the tanks together beneath the welding rod 37, the tank head carriers 29 are withdrawn, the tank in its support is rotated at right angles to the position shown in Figure 1 and removed, whereupon a new tank body is put into position as heretofore described.

The clamp 5 consists of a bifurcated ring pivoted at 5a and clamped together through the projecting arms 5b. A bracket 5c pivotally supports a cam 5d and actuating cam arm 5e. The cam 5d engages with a retaining ring or strap 5f. This ring or strap passes through the projecting arms 5b.

The opening of the cam-locked arms is effected by the spring 5g. In other words, the construction is for the purpose of providing a cam lock for the tank so as to round up the tank in order to take the place of the end covers, which in this construction cannot be used for this purpose as in previous methods.

It will be understood that it is desired to comprehend within this invention and the hereinafter appended claims, such changes and modifications as may be necessary to adapt this invention to various conditions of uses.

Having thus fully described our invention, what we claim as new and desire to secure by Letters Patent is:

1. In combination, swivelly supported guiding and driving wheels, means for driving at least one of said wheels, a ring mounted within said wheels adapted to rotate therewith and swivel therewith, a frame mounted on said ring, means on said frame for supporting a tank body through engagement with the longitudinal side of said tank body, reciprocating tank head supports adapted to reciprocate and rotate, and stationarily-mounted welding means for welding tank heads to tank bodies mounted adjacent to the juncture of the heads and bodies as they rotate.

2. In combination, a support for a tank body comprising tank body engaging means, said means comprising clamping means in contact with the end peripheral area of the longitudinal side of said tank; a ring connected therewith and adapted to support a tank body through said tank engaging means; means to guide and support said ring for rotation; means to drive said ring; means to swivelly mount said guiding and driving means for the ring whereby a tank so supported can be rotated on its axis with said ring and rotated about an axis vertical to its major axis so as to assume different angular positions; and means for contacting the tank heads at least in an annular area whose outer circumferential edge has a shorter radius than said tank head and for supporting said tank head against said tank body adapted to reciprocate to and from said tank body and to rotate with said tank.

3. In combination, a tank body support rotatable about the axis of a tank body mounted therein which axis extends centrally through the open ends of said body, said support also being swiveled on a line transverse to said axis, a pair of reciprocable and rotatable tank head supports on opposite sides of said body support contacting the tank heads in at least an annular area whose outer circumferential edge has a shorter radius than said tank head whereby said tank body support and head supports are adapted to rotate in synchronism with one another in one position of said body support, and means of forming a continuous weld between a tank body and tank heads during said rotation while said body and heads are supported in alignment by their respective supports.

4. In combination, a support for a tank body comprising tank engaging means, said means comprising clamping means in contact with the end peripheral area of the longitudinal side of said tank for holding the tank in a predetermined shape, a ring connected therewith, means to guide and support said ring for rotation, means to drive said ring, means to swivelly mount said guiding and driving means for the ring whereby a tank so supported can be rotated on its major axis with said ring and rotated about an axis vertical to its major axis so as to assume different angular positions, means for supporting tank heads against the ends of said tank body, said means for supporting tank heads being adapted to contact the tank heads at least in an annular area whose outer circumferential edge has a shorter radius than said tank head and to reciprocate to and from said tank body and to rotate with said tank body.

5. In combination, swivelly supported guiding and driving wheels, means for driving at least one of said wheels, a ring mounted within said wheels adapted to rotate therewith and swivel therewith, a frame mounted on said ring, means on said frame for engaging a tank body comprising clamping means in contact with the end peripheral area of the longitudinal side of said tank for holding the tank in a predetermined shape, reciprocating tank head supports adapted to contact the tank heads at least in an annular area whose outer circumferential edge has a shorter radius than said tank head and to reciprocate and rotate, and stationarily-mounted welding means for forming a continuous weld between tank heads and tank body mounted adjacent to the juncture of the heads and bodies as they rotate.

EARL E. EICKMEYER.
SAMUEL O. MAINS.

REFERENCES CITED

The following references are of record in the file of this patent:

UNITED STATES PATENTS

| Number | Name | Date |
|---|---|---|
| 392,853 | Clapp | Nov. 13, 1888 |
| 1,238,257 | Butler | Aug. 28, 1917 |
| 1,517,492 | Tevander | Dec. 2, 1924 |
| 1,550,651 | Charter | Aug. 18, 1925 |
| 1,684,128 | Edelmann | Sept. 11, 1928 |
| 2,020,830 | Gray | Nov. 12, 1935 |
| 2,091,308 | Catlett | Aug. 31, 1937 |
| 2,113,699 | Lowry | Apr. 12, 1938 |
| 2,219,742 | Haversack | Oct. 29, 1940 |
| 2,308,340 | Newlon | Jan. 12, 1943 |
| 2,313,393 | Mitchell | Mar. 9, 1943 |
| 2,320,079 | Hartwig | May 25, 1943 |
| 2,327,731 | McClarly | Aug. 24, 1943 |

FOREIGN PATENTS

| Number | Country | Date |
|---|---|---|
| 261,176 | Great Britain | Nov. 18, 1926 |